United States Patent [19]

Wilson et al.

[11] Patent Number: 4,562,165

[45] Date of Patent: Dec. 31, 1985

[54] REGENERATING SORBENTS

[75] Inventors: James Wilson; David J. A. McCaffrey, both of Cheltenham, England

[73] Assignee: Coal Industry (Patents) Ltd., London, England

[21] Appl. No.: 573,316

[22] Filed: Jan. 24, 1984

[30] Foreign Application Priority Data

Feb. 25, 1983 [GB] United Kingdom ............... 8305320

[51] Int. Cl.$^4$ ............................................. B01J 20/34
[52] U.S. Cl. ........................................... 502/33; 34/9; 210/674
[58] Field of Search ............... 34/9, 82; 210/674, 677, 210/689; 502/29, 31, 33

[56] References Cited

U.S. PATENT DOCUMENTS 3,275,549 9/1966 Crabb et al. .............................. 34/9
3,398,208 8/1968 Ward ................................... 210/689

FOREIGN PATENT DOCUMENTS 935233 8/1963 United Kingdom .
1174945 12/1969 United Kingdom .

Primary Examiner—Ivars Cintins
Attorney, Agent, or Firm—Stevens, Davis, Miller & Mosher

[57] ABSTRACT

Sorbents used for drying organic liquid process streams can be regenerated by passing an organic liquid carrier solvent such as n-octanol therethrough at a temperature sufficient to dissolve water trapped in the sorbent, thus regenerating it, and subsequently cooling the organic liquid carrier solvent/water solution such that it separates out allowing recycle of the organic liquid. This method of sorbent regeneration allows the use of low grade heat for regeneration thus improving the viability of sorbent drying plant.

11 Claims, 1 Drawing Figure

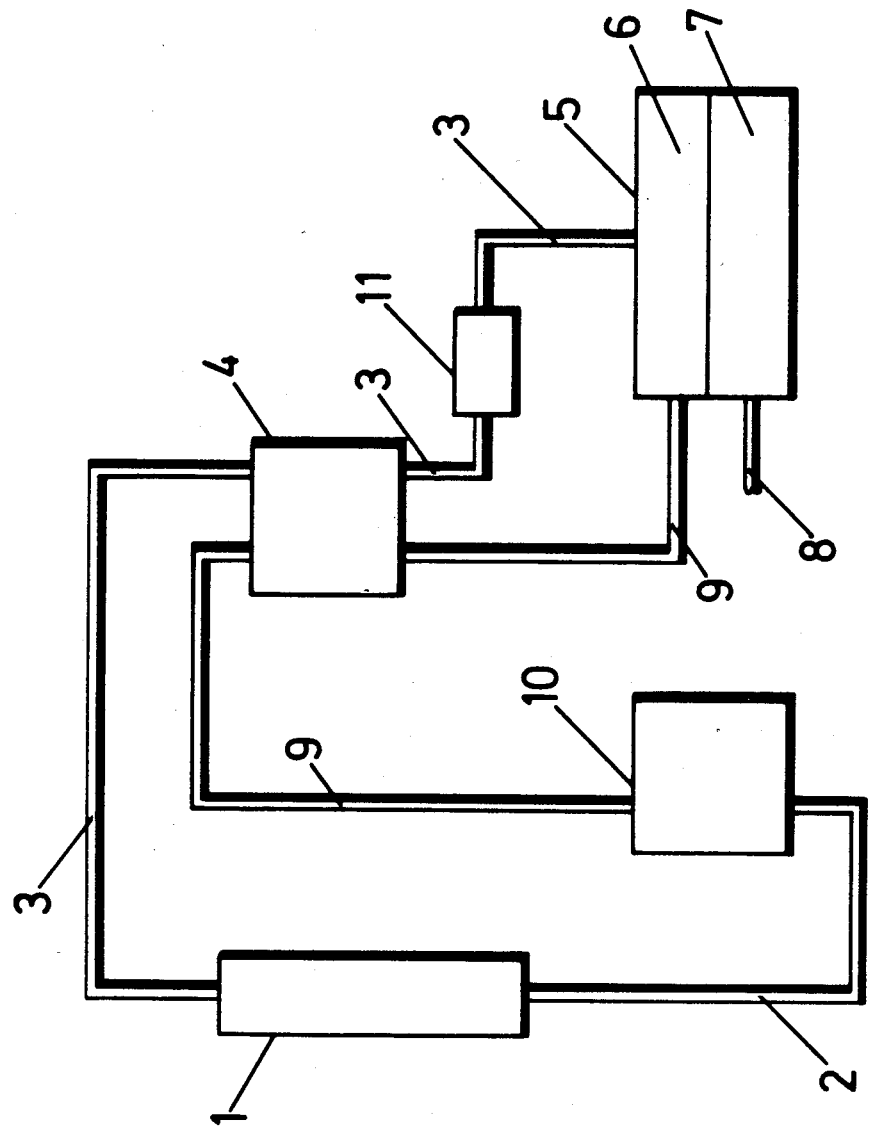

REGENERATING SORBENTS

This invention relates to improvements in regenerating sorbents and in particular in regenerating zeolite adsorbents of the type used for drying organic solvents.

In many chemical processes the solvent becomes contaminated. At the end of the process it is, therefore, necessary to dispose of it or to clean it for recycle. Cleaning the solvent can consist of filtering out solids and separating the solvent from soluble contaminants by fractional distillation. This may not produce a clean enough solvent as formation of azeotropes preclude the separation of solvent from a constant boiling point mixture with contaminants. Typically the azeotropes consist of an organic solvent and water such as; isopropylalcohol/water, ethanol/water etc.

It has been suggested that further purification of contaminated solvents or azeotropes may be achieved by using zeolite adsorbents. These separate components in a mixture according to molecular size and geometry e.g. it has been proposed to separate an ethanol/water mixture using a bed of type 3A zeolite which retains the water in its pores and excludes the ethanol. These zeolite adsorbents can be packed to form a bed between two gauzes at either end of a tube or column. Thus substantially the entire length of the tube contains the zeolite absorbent allowing an effective contact area between the absorbent and a contaminated solvent as it is passed through the column for drying.

In use, the adsorbent therefore, becomes saturated, or partially saturated, with water and requires periodical regeneration involving removal of the trapped water. At present this is achived by passing a heated gas through the sieve bed at a temperature sufficient to remove substantially all of the trapped water, typically a temperature within the range 200° C. to 300° C. The production of regeneration gas in this temperature range necessitates the use of high grade heat, whose cost may have significant effects on the overall cost of operating the adsorbent drying plants.

Hence it would appear that a need exists for a more economical method of adsorbent regeneration enabling higher returns to be realised in the efficiency and economy of the adsorbent drying plants. It is the aim of the present invention to provide such a method for the regeneration of zeolite adsorbents used in drying plant without the need for high grade heat.

The present invention provides a method for the regeneration of sorbents saturated or partially saturated with water, wherein a column containing a bed of the sorbent has passed there through an organic liquid carrier solvent at a first temperature in the range 60° C. to the boiling point of the carrier solvent, at which first temperature water has an appreciable solubility in the carrier solvent, preferably 7% to 10% w/w, such that at least a portion of the water trapped in the sorbent will be dissolved in the carrier solvent, cooling the resulting solution to a second temperature in the range 0° C. to 40° C., at which second temperature water has a low solubility in the carrier solvent, preferably 0% to 1% w/w, the difference in the water's solubility at the first and second temperatures preferably being in the range 3% to 7% w/w, and allowing the resulting solution to separate out into a substantially pure water phase and a substantially pure carrier solvent phase.

The type of sorbent used will typically be a zeolite of the A type for example 3A, 4A or 5A.

It is envisaged that temperatures in the higher of the above mentioned ranges, the water solvation temperature, will need to be in the range 60° C. to the boiling point of the solvent, preferably between 10° C. and 30° C. below the boiling point of the solvent, and that temperatures in the lower of the above mentioned ranges, the separation temperature, will need to be in the range 0° C. to 40° C., preferably in the range 5° C. to 20° C., thus preferably avoiding the need for refrigeration of the separating tank.

The carrier solvent will preferably be such that the difference in water's solubility in the carrier solvent at the first and second temperatures will be from 3% to 7% w/w. Suitable carrier solvents for water would include $C_6$ and higher straight and branched chain alkanols such as n-octanol and n-nonanol, polyglycols and polyglycol ethers.

Furthermore, the carrier solvent should not have a molecular structure such that it would be retained to any appreciable extent by the sorbent.

One embodiment of the invention will now be described by way of example only with reference to the accompanying schematic diagram. N-octanol at 100° C. enters the bottom of a column (1) packed with Type 3A zeolite of particle size in the range 1.4 mm to 2.00 mm containing 22% adsorbed water through line (2). The n-octanol absorbs 85% w/w of the water in the adsorbent and the resulting solution leaves the top of the column by line (3) to a heat exchanger (4). Here it gives up heat to fresh carrier solvent. From heat exchanger (4) the liquid passes through a secondary cooler (11), the new cooled solution is passed into a separation tank (5) at less than 20° C. Here the cooled solution separates into two liquid phases, water having substantially no n-octanol (7) and n-octanol having substantially no water (6). The water is taken off by a line (8). The recovered n-octanol is sent through line (9) to the heat exchanger (4) where it picks up heat from the solution leaving the column. Having been thus heated, the n-octanol passes to a second heat exchanger (10) where low grade plant heat is used to raise the temperature of the n-octanol to 100° C. It then passes through line 2 into the column.

As can be seen from the above the invention provides a method for drying zeolite adsorbents used for drying process solvents utilising a low grade heat source. This type of heat is readily available in chemical process plants thus providing a markedly more economical energy source for the drying process.

We claim:

1. A method for the regeneration of sorbents saturated or partially saturated with water, wherein a column containing a bed of the sorbent has passed therethrough an organic liquid carrier solvent at a first temperature in the range 60° C. to the boiling point of the carrier solvent, at which first temperature water has an appreciable solubility in the carrier solvent, such that at least a portion of the water trapped in the sorbent will be dissolved in the carrier solvent, cooling the resulting solution to a second temperature in the range 0° C. to 40° C., at which second temperature water has a low solubility in the carrier solvent, and allowing the resulting solution to separate out into a substantially pure water phase and a substantially pure carrier solvent phase.

2. A method as claimed in claim 1, wherein the carrier solvent has a water solubility at the first temperature in the range 7% to 10% w/w.

3. A method as claimed in claim 1, wherein the carrier solvent has a water solubility at the second temperature in the range 0% to 1% w/w.

4. A method as claimed in claim 1, wherein the difference in the water solubility in the carrier solvent at the first and second temperatures is in the range 3% to 7% w/w.

5. A method as claimed in claim 1, wherein the first temperature is in the range 10° C. to 30° C. below the boiling point of the carrier solvent.

6. A method as claimed in claim 1, wherein the second temperature is in the range 5° C. to 20° C.

7. A method as claimed in claim 1, wherein the sorbent material is a zeolite adsorbent of the A type.

8. A method as claimed in claim 7, wherein the zeolite has a particle size in the range 2.00 mm to 50 μm.

9. A method as claimed in claim 7, wherein the zeolite has a particle size in the range 2.00 mm to 200 μm.

10. A method as claimed in claim 7, wherein the zeolite is a 3A, 4A or 5A zeolite.

11. A method as claimed in claim 1, wherein the carrier solvent is selected from C6 and higher straight and branched chain alkanols selected from the group consisting essentially of n-octanol and n-nonanol, polyglycols, polyglycol ethers and mixtures thereof.

* * * * *